US009669601B2

(12) United States Patent
Marx et al.

(10) Patent No.: US 9,669,601 B2
(45) Date of Patent: Jun. 6, 2017

(54) MULTILAYER EROSION RESISTANT PROTECTIVE FILMS

(75) Inventors: Ryan E. Marx, Rosemount, MN (US); Jay M. Jennen, Forest Lake, MN (US); Daniel E. Meyer, Lake Elmo, MN (US); William J. Schultz, North Oaks, MN (US); Wendy L. Thompson, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/818,206

(22) PCT Filed: Sep. 2, 2011

(86) PCT No.: PCT/US2011/050278
§ 371 (c)(1),
(2), (4) Date: Feb. 21, 2013

(87) PCT Pub. No.: WO2012/031168
PCT Pub. Date: Mar. 8, 2012

(65) Prior Publication Data
US 2013/0157027 A1 Jun. 20, 2013

Related U.S. Application Data

(60) Provisional application No. 61/379,543, filed on Sep. 2, 2010.

(51) Int. Cl.
*B32B 7/02* (2006.01)
*B32B 27/08* (2006.01)
(Continued)

(52) U.S. Cl.
CPC ............... *B32B 7/02* (2013.01); *B32B 27/08* (2013.01); *B32B 27/40* (2013.01);
(Continued)

(58) Field of Classification Search
CPC B32B 27/40; B32B 27/20; B32B 7/20; B32B 2307/537; B32B 2307/554;
(Continued)

(56) References Cited

U.S. PATENT DOCUMENTS 4,061,815 A * 12/1977 Poole, Jr. .................... 428/215
5,376,443 A * 12/1994 Sijan et al. .................. 428/332
(Continued)

FOREIGN PATENT DOCUMENTS

DE 4022741 A1 * 1/1992
EP 0359532 3/1990
(Continued)

OTHER PUBLICATIONS

English translation of DE 4022741 A1 abstract.*
(Continued)

*Primary Examiner* — Joanna Pleszczynska
(74) *Attorney, Agent, or Firm* — Philip P. Soo; Philip Y. Dahl

(57) ABSTRACT

Multilayer polymeric films which may be useful for protecting the leading edges of aircraft from rain and sand erosion are presented. Typical surface protection films comprising two or more layers of a first material alternating with one or more layers of a second material, wherein the first and second materials are different materials, wherein the first and second materials comprise first and second polymers, wherein the first and second materials have a first and second Shore hardness, and wherein the first Shore hardness is greater than the second Shore hardness by more than 5 A or more typically more than 10 A.

58 Claims, 1 Drawing Sheet

(51) Int. Cl.
  *B32B 27/40* (2006.01)
  *B32B 27/34* (2006.01)
  *B32B 27/32* (2006.01)
  *B32B 27/36* (2006.01)

(52) U.S. Cl.
  CPC ....... *B32B 2250/05* (2013.01); *B32B 2250/24* (2013.01); *B32B 2250/42* (2013.01); *B32B 2307/536* (2013.01); *B32B 2307/554* (2013.01); *B32B 2603/00* (2013.01); *B32B 2605/18* (2013.01); *Y10T 428/24983* (2015.01)

(58) Field of Classification Search
  CPC ....... B32B 2375/00; B32B 7/02; B32B 27/08; B32B 2250/05; B32B 2250/24; B32B 2250/42; B32B 2307/536; B32B 2603/00; B32B 2605/18; Y10T 428/24983
  USPC ....... 428/212, 343, 354, 411.1, 423.1, 423.3, 428/423.5, 423.7, 424.2, 425.5, 447, 480, 428/483, 500, 515, 217
  See application file for complete search history.

(56) References Cited

U.S. PATENT DOCUMENTS

| | | | |
|---|---|---|---|
| 5,395,681 A * | 3/1995 | Hargarter | B32B 27/40 206/455 |
| 5,656,364 A | 8/1997 | Rickerby | |
| 5,866,257 A | 2/1999 | Schledjewski et al. | |
| 5,958,570 A * | 9/1999 | Schwambach et al. | 428/217 |
| 5,965,256 A | 10/1999 | Barrera | |
| 6,524,712 B1 * | 2/2003 | Schledjewski | B29C 47/0023 428/423.1 |
| 6,607,831 B2 * | 8/2003 | Ho et al. | 428/423.1 |
| 7,596,986 B2 | 10/2009 | Daniels | |
| 2002/0114951 A1 * | 8/2002 | Horansky | 428/412 |
| 2005/0271881 A1 * | 12/2005 | Hong | B82Y 30/00 428/423.1 |

FOREIGN PATENT DOCUMENTS

| | | |
|---|---|---|
| FR | 2693477 | 1/1994 |
| GB | 2047188 | 11/1980 |
| JP | 3019352 | 1/1991 |
| JP | H07-060889 | 3/1995 |
| JP | 2000-191993 | 7/2000 |
| RU | 2235645 | 9/2004 |
| WO | WO 95/00332 | 1/1995 |
| WO | WO 2008-157013 | 12/2008 |

OTHER PUBLICATIONS

Engel, "Investigation of Composite Coating Systems for Rain-Erosion Protection", Naval Air Systems Command Report # AD-783 552, Florida Atlantic University, Jul. 15, 1974. pp. 1-96.
International Search Report for PCT International Application No. PCT/US2011/050278, International Filing Date Sep. 2, 2011, 4 pages.
ERCoat brochure, MTU Aero Engines GmbH, Munich, Germany, www.mtu.de—website visited Jun. 11, 2013, 2 pages.

* cited by examiner

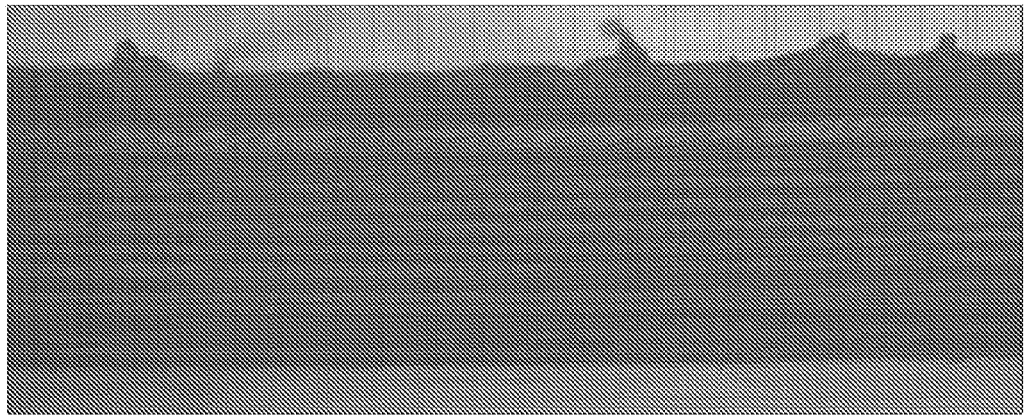

MULTILAYER EROSION RESISTANT PROTECTIVE FILMS

CROSS REFERENCE TO RELATED APPLICATION

This application claims the benefit of U.S. Provisional Patent Application No. 61/379,543, filed Sep. 2, 2010, the disclosure of which is incorporated by reference herein in its entirety.

FIELD OF THE DISCLOSURE

This disclosure relates to multilayer polymeric films which may be useful for protecting the leading edges of aircraft from rain and sand erosion.

BACKGROUND OF THE DISCLOSURE

Leading edges of aircraft, e.g., wings, helicopter rotors, radomes, and the like, are subject to erosion caused by the impact of airborne material, such as rain, sand, and dust during flight. The aircraft industry has sought means of protection against such erosion.

The following references may be relevant to such technologies: WO 2008/157013, FR2693477, U.S. Pat. No. 5,656,364, GB2047188 and Naval Air Systems Command Report # AD-783 552 "INVESTIGATION OF COMPOSITE COATING SYSTEMS FOR RAIN-EROSION PROTECTION", Olive G. Engel, et al, Florida Atlantic University, 1974.

SUMMARY OF THE DISCLOSURE

Briefly, the present disclosure provides a surface protection film comprising two or more layers of a first material alternating with one or more layers of a second material, wherein the first and second materials are different materials, wherein the first and second materials comprise first and second polymers, wherein the first and second materials have a first and second Shore hardness, and wherein the first Shore hardness is greater than the second Shore hardness by more than 5 A or more typically more than 10 A. Typically, adjacent layers of first and second materials are in intimate contact. In some embodiments, adjacent layers of first and second materials are linked by covalent bonds. In some embodiments, adjacent layers of first and second materials are linked by covalent bonds of polymerization of the first and second polymers. In some embodiments, the surface protection film additionally comprises a layer of adhesive.

Some embodiments comprise two or more layers of the first material alternating with two or more layers of the second material. Some embodiments comprise three or more layers of the first material alternating with two or more layers of the second material. Some embodiments comprise three or more layers of the first material alternating with three or more layers of the second material. Some embodiments comprise four or more layers of the first material alternating with three or more layers of the second material. Some embodiments comprise five or more layers of the first material alternating with four or more layers of the second material. Some embodiments comprise ten or more layers of the first material alternating with nine or more layers of the second material.

In some embodiments, the first and second polymers are different polymers belonging to a single class of polymers. In some embodiments, the class of polymers is selected from the group of classes consisting of polyurethanes, polyureas, polyamides, polyesters, polyacrylates, silicones and polyolefins.

In some embodiments, first and second materials differ by the amount or identity of added fillers; and in some such embodiments first and second polymers are the same polymer.

In some embodiments, the first and second materials polymers are visibly different such that wear-through of the top layer of the first material may be detected by visual inspection. In some such embodiments, the first and second materials differ in hue. In some such embodiments, the first and second materials differ in brightness.

In this application:

"intimate contact" as applied to adjacent layers of materials, means contact such as results from coextrusion of adjacent layers of polymeric material; and "substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.

BRIEF DESCRIPTION OF THE DRAWING

FIG. 1 is a photograph (micrograph) of a cross section of a film according to the present disclosure, as described in Example 1 below.

DETAILED DESCRIPTION

The present disclosure provides a surface protection film comprising two or more layers of a first material alternating with one or more layers of a second material, wherein the first and second materials are different materials, wherein the first and second materials comprise first and second polymers, wherein the first and second materials have a first and second Shore hardness, and wherein the first Shore hardness is greater than the second Shore hardness by more than 5 A. In some embodiments, adjacent layers of first and second materials are in intimate contact. In some embodiments, adjacent layers of first and second materials are linked by covalent bonds. In some embodiments, adjacent layers of first and second materials are linked by covalent bonds of polymerization of the first and second polymers. In some embodiments, first and second polymers are different polymers belonging to a single class of polymers. In some embodiments, the surface protection film is borne on an outer surface of an aircraft and/or an outer surface of an airfoil.

The present disclosure additionally provides methods of making and using the surface protection film disclosed herein.

The surface protection film according to the present disclosure can be made by any suitable method. In some embodiments, the surface protection film is made by lamination of layers of the first and second materials. In some embodiments, the surface protection film is made by co-extrusion of layers of the first and second materials. In some embodiments, the surface protection film is made by reactive co-extrusion of layers of the first and second materials. Some such embodiments may result in linkage by covalent bonds between adjacent layers of first and second materials, in particular where polymerization or crosslinking of one or both of the first and second materials occurs during extrusion. Some such embodiments may result in linkage by covalent bonds of polymerization between adjacent layers of first and second materials, in particular where polymerization or crosslinking of one or both of the first and second materials occurs during extrusion. Some embodiments may include combinations of the preceding methods, e.g., lamination of films made by the co-extrusion of layers of the first and second materials. Some embodiments may include cure of one or both of the first or second materials during formation of the surface protection film. Some embodiments may include cure of one or both of the first or second materials after formation of the surface protection film.

The present disclosure includes, without limitation, the following numbered listing of embodiments. Various modifications and alterations of this disclosure will become apparent to those skilled in the art without departing from the scope and principles of this disclosure, and it should be understood that this disclosure is not to be unduly limited to the illustrative embodiments set forth herein.

Representative Embodiments Include

1. A surface protection film comprising two or more layers of a first material alternating with one or more layers of a second material, wherein the first and second materials are different materials, wherein the first and second materials comprise first and second polymers, wherein the first and second materials have a first and second Shore hardness, and wherein the first Shore hardness is greater than the second Shore hardness by more than 5 A.
2. The surface protection film of embodiment 1 wherein adjacent layers of first and second materials are in intimate contact.
3. The surface protection film of embodiment 1 or 2 wherein adjacent layers of first and second materials are linked by covalent bonds.
4. The surface protection film of embodiment 1 or 2 wherein adjacent layers of first and second materials are linked by covalent bonds of polymerization of the first and second polymers.
5. The surface protection film of any of the preceding numbered embodiments wherein first and second polymers are different polymers belonging to a single class of polymers.
6. The surface protection film of embodiment 5 wherein the class of polymers is selected from the group of classes consisting of polyurethanes, polyureas, polyamides, polyesters, polyacrylates, silicones and polyolefins.
7. The surface protection film of embodiment 5 wherein the class of polymers is polyurethanes.
8. The surface protection film of embodiment 5 wherein the class of polymers is polyureas.
9. The surface protection film of embodiment 5 wherein the class of polymers is polyamides.
10. The surface protection film of embodiment 5 wherein the class of polymers is polyesters.
11. The surface protection film of embodiment 5 wherein the class of polymers is polyacrylates.
12. The surface protection film of embodiment 5 wherein the class of polymers is silicones.
13. The surface protection film of embodiment 5 wherein the class of polymers is polyolefins.
14. The surface protection film of any of the preceding numbered embodiments wherein the first and second materials comprise first and second fillers.
15. The surface protection film of embodiment 14 wherein the first and second fillers are different fillers.
16. The surface protection film of embodiment 14 wherein the first and second fillers are the same filler.
17. The surface protection film of embodiment 14 wherein the first and second polymers are the same polymer.
18. The surface protection film of embodiment 15 wherein the first and second polymers are the same polymer.
19. The surface protection film of embodiment 16 wherein the first and second polymers are the same polymer and wherein the first and second materials differ by amount of filler present.
20. The surface protection film of any of the preceding numbered embodiments wherein the first Shore hardness is greater than the second Shore hardness by more than 10 A.
21. The surface protection film of any of the preceding numbered embodiments wherein the first Shore hardness is greater than the second Shore hardness by more than 15 A.
22. The surface protection film of any of the preceding numbered embodiments wherein the first Shore hardness is greater than the second Shore hardness by more than 20 A.
23. The surface protection film of any of the preceding numbered embodiments wherein the first Shore hardness is greater than the second Shore hardness by more than 25 A.
24. The surface protection film of any of the preceding numbered embodiments wherein the first Shore hardness is greater than the second Shore hardness by more than 30 A.
25. The surface protection film of any of the preceding numbered embodiments wherein the first Shore hardness is greater than the second Shore hardness by more than 35 A.
26. The surface protection film of any of the preceding numbered embodiments wherein the first Shore hardness is greater than the second Shore hardness by more than 40 A.
27. The surface protection film of any of the preceding numbered embodiments wherein the first Shore hardness is greater than the second Shore hardness by more than 45 A.
28. The surface protection film of any of the preceding numbered embodiments wherein the first Shore hardness is greater than the second Shore hardness by more than 50 A.
29. The surface protection film of any of the preceding numbered embodiments wherein the first and second materials differ in hue.
30. The surface protection film of any of the preceding numbered embodiments wherein the first and second materials differ in brightness.
31. The surface protection film of any of the preceding numbered embodiments wherein the first and second materials differ visibly in hue when viewed in sunlight.
32. The surface protection film of any of the preceding numbered embodiments wherein the first and second materials differ visibly in brightness when viewed in sunlight.
33. The surface protection film of any of the preceding numbered embodiments comprising two or more layers of the first material alternating with two or more layers of the second material.
34. The surface protection film of any of the preceding numbered embodiments comprising three or more layers of the first material alternating with two or more layers of the second material.

35. The surface protection film of any of the preceding numbered embodiments comprising three or more layers of the first material alternating with three or more layers of the second material.
36. The surface protection film of any of the preceding numbered embodiments comprising four or more layers of the first material alternating with three or more layers of the second material.
37. The surface protection film of any of the preceding numbered embodiments comprising five or more layers of the first material alternating with four or more layers of the second material.
38. The surface protection film of any of the preceding numbered embodiments comprising ten or more layers of the first material alternating with nine or more layers of the second material.
39. The surface protection film of any of the preceding numbered embodiments additionally comprising a layer of adhesive.
40. The surface protection film of any of the preceding numbered embodiments bound to an outer surface of an aircraft.
41. The surface protection film of embodiment 23 bound to an outer surface of an aircraft by the layer of adhesive.
42. The surface protection film of any of the preceding numbered embodiments bound to an outer surface of an airfoil.
43. The surface protection film of embodiment 39 bound to an outer surface of an airfoil by the layer of adhesive.
44. A method of protecting an outer surface of an aircraft comprising the step of attaching a surface protection film according to any of the preceding numbered embodiments to the surface.
45. A method of protecting an outer surface of an aircraft comprising the step of attaching a single layer of a surface protection film according to any of the preceding numbered embodiments to the surface.
46. A method of protecting an outer surface of an airfoil comprising the step of attaching a surface protection film according to any of the preceding numbered embodiments to the surface.
47. A method of protecting an outer surface of an airfoil comprising the step of attaching a single layer of a surface protection film according to any of the preceding numbered embodiments to the surface.
48. A method of protecting an outer surface of an airfoil comprising the step of attaching a single layer of a surface protection film according to any of the preceding numbered embodiments to the surface.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:
° F.: Degrees Fahrenheit
° C.: Degrees Centigrade
ft/min feet/minute
ft/sec feet/second
m/min meters/minute
m/sec meters/sec
lbs pounds
mil: $10^{-3}$ inches
μm: micrometers
mm: millimeters
cm: centimeters
kPa: kilopascals
psi: pounds per square inch
mg: milligrams
BDO refers to 1,4-butanediol, obtained from Alfa Aesar, Ward Hill, Mass.
CLPU refers to caprolactone based thermoplastic polyurethane, obtained under the trade designation "CLA-93 A-V" from Lubrizol Corporation, Wickliffe, Ohio, having a Shore A hardness of 90.
DBTDL refers to dibutyltin dilaurate, obtained under the trade designation "DABCO T-12" from Air Products & Chemicals, Inc., Allentown, Pa.
GPU refers to a grey pigmented polyurethane, matched to color 36173 according to Fed Std 595c, obtained from Americhem, Inc, Cuyahoga Falls, Ohio.
IPDI refers to isophorone diisocyanate, obtained under the trade designation "VESTANAT IPDI" from Evonik Industries, Essen, Germany.
PEPU refers to a polyether based thermoplastic polyurethane, obtained under the trade designation "ESTANE MVT75 AT3" from Lubrizol Corporation, having a Shore A hardness of 75.
PTMEG refers to polytetramethylene ether glycol, having an average molecular weight of 1,000, obtained under the trade designation "TERATHANE 1000" from Invista S.ar.L., Wichita, Kans.
TEPS refers to n-triethoxypropylsilane, obtained from Sigma-Aldrich Company, St. Louis, Mo.
TESPI refers to 3-triethoxysilylpropyylisocyanate, obtained from Sigma-Aldrich Company.
TX10693 refers to an aqueous 90 nm silica sol, obtained under the trade designation "TX10693" from Nalco Company, Naperville, Ill.

Test Methods:
Rain Erosion Simulator:

A test apparatus for measuring the impact of liquid drops, as described in U.S. Pat. No. 7,596,986 (Daniels et al.), the reference of which is incorporated herein in its entirety, was assembled as follows. A 0.177 caliber air gun, model name "DROZD AIR GUN" from European American Armory Corporation, Cocoa, Fla., was fitted with a 4.5 mm polyvinyl barrel. Firing velocity was controlled by means of a compressed nitrogen gas supply. Circular test samples with a diameter of 3 inches (7.6 cm) were attached to a 304 grade stainless steel plate using an adhesive transfer tape, trade designation "ADHESIVE TRANSFER TAPE 965" from 3M Company. The plate was then affixed vertically and a continuous stream of water flowed over the sample, approximately 0.06 inches thick (0.16 cm). Grade II acetate pellets with a diameter of 4.5 mm, from Engineering Laboratories, Inc., Oakland, N.J., were fired at the test sample, were fired at the test sample, the velocity of which was measured using a model "CED MILLENIUM CHRONOGRAPH" from Competitive Edge Dynamics, LLC, Orefield, Pa. The number of pellets fired until the test sample failed, that is, the underlying substrate was exposed due to cracking of the protective film, was recorded.

Sand Erosion Test:
3 by 2.67 inch (7.62 by 6.78 cm) samples of Comparative C and Example 2 were laminated to an adhesive transfer film, obtained under the trade designation "965 Adhesive Transfer Film", from 3M Company, and applied to a 3 by 2.67 inch (7.62 by 6.78 cm) aluminum panel. After recording the initial mass, each panel was then attached to an aluminum plate set 3 inches (7.62 cm), and at an angle of 30 degrees, to a sand blast gun, model number "SBC 420", from Atlas Handling Systems, LLC. Two kg of aluminum oxide, obtained under the trade designation "46 GRIT BLAST MEDIA" from Grainger, Lake Forest, Ill., was fired at the test sample at a pressure of 70 psi (482.6 kPa) for approximately 2 minutes, after which the panel was removed and reweighed.

Example 1

PEPU (shore A hardness of 75) and CLPU (shore A hardness of 90) were coextruded into a 29-layer film as follows. PEPU was fed at 365° F., at a rate of 10 lbs/hr (4.54 kg/hr) into a 1¼-inch (3.18 cm) single screw extruder, model "KILLION KTS-125" from Davis-Standard, LLC, Pawcatuck, Conn. CLPU and GPU were fed into a 25 mm twin screw extruder, model "BERSTORFF ZE25" from KraussMaffei Corp., Florence, Ky., set at 365° F., at rates of 9.4 lbs/hr (4.26 kg/hr) and 0.6 lbs/hr (0.27 kg/hr) respectively. Thus both polyurethanes were fed at 365° F. at a rate of 10 lbs/hr (4.54 kg/hr) into a 2-component multi-layer extrusion die. The extruded film was cast onto a chilled 3-roll stack at a line speed of 9 ft/min (m/min) and wound up with a silicone coated paper liner. The resultant 29-layer film was 14 mil thick (355.6 μm) and 7 inches (17.78 cm) wide, composed of alternating layers of 94% CLPU/6% GPU and PEPU, with the CLPU layers as the outermost layers. A photograph of a cross section of this film is shown in FIG. 1.

Comparative A

CLPU was coextruded into a 29-layer film using a 1¼-inch (3.18 cm) single screw extruder, model "KILLION KTS-125" from Davis-Standard, LLC, Pawcatuck, Conn., and a 25 mm twin screw extruder, model "BERSTORFF ZE25" from KraussMaffei Corp., Florence, Ky. Both extruders were set at 365° F., each feeding the polyurethane at 10 lbs/hr (4.54 kg/hr) into a 2-component multi-layer extrusion die. The extruded film was cast onto a chilled 3-roll stack at a line speed of 9 ft/min (m/min) and wound up with a silicone coated paper liner. The resultant film was 14 mil thick (355.6 μm) and 7 inches (17.78 cm) wide. In contrast to the film of Example 1, the film of Comparative A was composed of a single polymer, the CLPU.

Comparative A and Example 1 films were subjected to the Rain Erosion Simulator, 5 shots/second and pressure of 90 psi (620.5 kPa). Pellet velocity was measured at an average of 485 ft/sec (147.8 m/sec). Results are listed in Table 1.

TABLE 1

| Sample | Average Number of Shots To Failure |
|---|---|
| Comparative A | 28 |
| Example 1 | 53 |

Thus the film of Example 1 demonstrated superior rain erosion resistance.

Comparatives B-C

Silica-Silane Dispersion:

80 grams PTMEG was dissolved in 35 grams dry ethyl acetate at 70° F. (21.1° C.), to which 9.9 grams TESPI was slowly added. Four drops of DBTDL was then added and the temperature kept below 40° C. while continuing to stir the mixture for 16 hours. Residual ethyl acetate was then removed by vacuum distillation using a Buchi rotoevaporator set in an oil bath at 65° C. The molecular weight of the polymer was found to be 2250. A pre-mix was then prepared by mixing 57.1 grams of the polymer with 1,500 grams 1-methoxy-2-propanol and 1.75 grams TEPS.

750 grams TX10693 was added to a 3-necked flask, the pre-mix slowly added over a period of 10 minutes, and the mixture held between 90-95° C. for 20 hours. After cooling the mixture was poured into an aluminum foil pan and dried at 70° F. (21.1° C.) for 48 hours. The silica content of the resultant white silica-silane powder was determined to be 85.5% by weight.

290 grams of the dried powder was dispersed in 1,000 grams of a 50:50 by weight acetone:tetrahydrofuran mixture for 90 seconds at 70° F. (21.1° C.) using a high speed shear mixer set at 75% power, model L4R, obtained from Silverson Machines, Inc., East Longmeadow, Mass. After standing for 10 minutes, the dispersion was filtered through a 100 μm nylon mesh, obtained under the trade designation "SPECTRA MESH 100 μm WOVEN FILTER" from Spectrum Laboratories, Inc., Rancho Domenguez, Calif. The silicasilane content of the dispersion was measured and found to be 23.5% by weight.

1,000 grams of the silica-silane dispersion was mixed with 340 grams PTMEG then stripped in the Buchi rotoevaporator for approximately 90 minutes at 65° C., then for 30 minutes at 120° C. Silica and silica-silane concentrations were found to be 39.0 and 45.6% by weight, respectively.

Polyurethane Films:

Examples of the polyurethane film of the present invention, and comparative films, were prepared as follows according to the compositions listed in Table 2. The silicasilane dispersion, and BDO were mixed in a 50 ml. polyethylene beaker then dried in a vacuum oven for 3 hours at 70° C. and 0.97 atmospheres pressure (98.3 kPa) to remove any traces of water. IPDI was added, followed by DBTDL, mixed until homogeneous, then cast to a thickness of 12 mil (304.8 μm) between two 3-mil (7.26 μm) thick polyethylene release liners and cured for 2 hours at 70° C. The polyethylene liners were removed from the resultant polyurethane film, silicone coated paper liners were applied. Comparative B was repressed to 22 mil (558.8 μm), and Comparative C repressed to 8 mil (203.2 μm), in a hot press, model number "50-2424-2TM" from Wabash Metal Products, Inc., Wabash, Ind., at 120° C.

TABLE 2

| Sample | Silica-Silane Dispersion | BDO | IPDI | DBTDL |
|---|---|---|---|---|
| Comparative B | 40.0 | 0.40 | 6.56 | 0.23 |
| Comparative C | 10.0 | 2.00 | 6.79 | 0.09 |

Example 2

Comparative B and Comparative C were cut into 1 by 1-inch (2.54 by 2.54 cm) squares. Six of each Comparative were then stacked, alternately, between two silicone paper liners, with Comparative B on top, into a 12-layer composite. The stack was repressed at 120° C. to a thickness of 40 mil (1.016 mm) to make a film having alternating hard and soft layers, designated Example 2.

Comparatives B and C and Example 2 were subjected to the Rain Erosion Simulator, 4 shots/second at a pressure of 60 psi (413.7 kPa) and an average velocity of 343 ft/sec (104.6 m/sec). Comparatives B and C and Example 2 were subjected to the Sand Erosion Test. Results are listed in Tables 3 and 4, respectively.

TABLE 3

| Sample | Average Number of Shots To Failure |
| --- | --- |
| Comparative B | 30 |
| Comparative C | >300 |
| Example 2 | >350 |

TABLE 4

| Sample | Cumulated Mass Eroded (mg) |
| --- | --- |
| Comparative B | 6.8 |
| Comparative C | 127.7 |
| Example 2 | 6.4 |

It can be readily seen that the film of Example 2 demonstrates high performance in both tests, simultaneously combining rain erosion resistance and sand erosion resistance.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A surface protection film comprising five or more layers of a first material alternating with four or more layers of a second material, wherein the first and second materials are different materials, wherein the first and second materials comprise first and second polyurethane polymers, wherein the first and second materials have a first and second Shore hardness, and wherein the first Shore hardness is greater than the second Shore hardness by more than 5 A, wherein an outermost layer of the surface protection film is comprised of the first material.

2. The surface protection film of claim 1 wherein adjacent layers of first and second materials are in intimate contact.

3. The surface protection film of claim 1 wherein adjacent layers of first and second materials are linked by covalent bonds.

4. The surface protection film of claim 1 wherein adjacent layers of first and second materials are linked by covalent bonds of polymerization of the first and second polymers.

5. The surface protection film of claim 1 wherein the first and second materials comprise first and second fillers.

6. The surface protection film of claim 5 wherein the first and second fillers are different fillers.

7. The surface protection film of claim 5 wherein the first and second fillers are the same filler.

8. The surface protection film of claim 5 wherein the first and second polymers are the same polymer.

9. The surface protection film of claim 6 wherein the first and second polymers are the same polymer.

10. The surface protection film of claim 7 wherein the first and second polymers are the same polymer and wherein first and second materials differ by amount of filler present.

11. The surface protection film of claim 1 wherein the first Shore hardness is greater than the second Shore hardness by more than 10 A.

12. The surface protection film of claim 1 wherein the first and second materials differ in hue or brightness.

13. The surface protection film of claim 1 comprising ten or more layers of the first material alternating with nine or more layers of the second material.

14. The surface protection film of claim 1 additionally comprising a layer of adhesive.

15. The surface protection film of claim 1 bound to an outer surface of an aircraft.

16. The surface protection film of claim 14 bound to an outer surface of an aircraft by the layer of adhesive.

17. A surface protection film comprising five or more layers of a first material alternating with four or more layers of a second material, wherein the first and second materials are different materials, wherein the first and second materials comprise first and second polymers, wherein the first and second materials have a first and second Shore hardness, wherein the first Shore hardness is greater than the second Shore hardness by more than 5 A, wherein the surface protection film is made by reactive co-extrusion of layers of the first and second materials and adjacent layers of first and second materials are linked by covalent bonds of polymerization of the first and second polymers, and wherein an outermost layer of the surface protection film is comprised of the first material.

18. The surface protection film of claim 17 wherein first and second polymers are different polymers belonging to a single class of polymers.

19. The surface protection film of claim 18 wherein the class of polymers is selected from the group of classes consisting of polyurethanes, polyureas, polyamides, polyesters, polyacrylates, silicones and polyolefins.

20. The surface protection film of claim 17 wherein the first and second materials comprise first and second fillers.

21. The surface protection film of claim 20 wherein the first and second fillers are different fillers.

22. The surface protection film of claim 20 wherein the first and second fillers are the same filler.

23. The surface protection film of claim 20 wherein the first and second polymers are the same polymer.

24. The surface protection film of claim 21 wherein the first and second polymers are the same polymer.

25. The surface protection film of claim 22 wherein the first and second polymers are the same polymer and wherein the first and second materials differ by amount of filler present.

26. The surface protection film of claim 17 wherein the first Shore hardness is greater than the second Shore hardness by more than 10 A.

27. The surface protection film of claim 17 wherein the first and second materials differ in hue or brightness.

28. The surface protection film of claim 17 comprising ten or more layers of the first material alternating with nine or more layers of the second material.

29. The surface protection film of claim 17 additionally comprising a layer of adhesive.

30. The surface protection film of claim 17 bound to an outer surface of an aircraft.

31. The surface protection film of claim 29 bound to an outer surface of an aircraft by the layer of adhesive.

32. A surface protection film comprising five or more layers of a first material alternating with four or more layers of a second material, wherein the first and second materials are different materials, wherein the first and second materials comprise first and second polymers, wherein the first and second materials have a first and second Shore hardness, and wherein the first Shore hardness is greater than the second Shore hardness by more than 5 A, and wherein the first Shore hardness is greater than or equal to about 90 A, wherein an outermost layer of the surface protection film is comprised of the first material.

33. The surface protection film of claim 32 wherein adjacent layers of first and second materials are in intimate contact.

34. The surface protection film of claim 32 wherein adjacent layers of first and second materials are linked by covalent bonds.

35. The surface protection film of claim 32 wherein adjacent layers of first and second materials are linked by covalent bonds of polymerization of the first and second polymers.

36. The surface protection film of claim 32 wherein first and second polymers are different polymers belonging to a single class of polymers.

37. The surface protection film of claim 36 wherein the class of polymers is selected from the group of classes consisting of polyurethanes, polyureas, polyamides, polyesters, polyacrylates, silicones and polyolefins.

38. The surface protection film of claim 32 wherein the first and second materials comprise first and second fillers.

39. The surface protection film of claim 38 wherein the first and second fillers are different fillers.

40. The surface protection film of claim 38 wherein the first and second fillers are the same filler.

41. The surface protection film of claim 38 wherein the first and second polymers are the same polymer.

42. The surface protection film of claim 39 wherein the first and second polymers are the same polymer.

43. The surface protection film of claim 40 wherein the first and second polymers are the same polymer and wherein the first and second materials differ by amount of filler present.

44. The surface protection film of claim 32 wherein the first Shore hardness is greater than the second Shore hardness by more than 10 A.

45. The surface protection film of claim 32 wherein the first and second materials differ in hue or brightness.

46. The surface protection film of claim 32 comprising ten or more layers of the first material alternating with nine or more layers of the second material.

47. The surface protection film of claim 32 additionally comprising a layer of adhesive.

48. The surface protection film of claim 32 bound to an outer surface of an aircraft.

49. The surface protection film of claim 47 bound to an outer surface of an aircraft by the layer of adhesive.

50. The surface protection film of claim 36 wherein first and second polymers are different polymers belonging to a single class of polymers.

51. The surface protection film of claim 50 wherein the class of polymers is selected from the group of classes consisting of polyurethanes, polyureas, polyamides, polyesters, polyacrylates, silicones and polyolefins.

52. The surface protection film of claim 1 wherein the first and second materials comprise first and second thermoplastic polyurethane polymers.

53. The surface protection film of claim 1 wherein the first Shore hardness is greater than the second Shore hardness by more than 20 A.

54. The surface protection film of claim 1 wherein the first Shore hardness is greater than the second Shore hardness by more than 25 A.

55. The surface protection film of claim 17 wherein the first Shore hardness is greater than the second Shore hardness by more than 20 A.

56. The surface protection film of claim 17 wherein the first Shore hardness is greater than the second Shore hardness by more than 25 A.

57. The surface protection film of claim 32 wherein the first Shore hardness is greater than the second Shore hardness by more than 20 A.

58. The surface protection film of claim 32 wherein the first Shore hardness is greater than the second Shore hardness by more than 25 A.

* * * * *